(12) United States Patent
Son et al.

(10) Patent No.: US 10,719,690 B2
(45) Date of Patent: Jul. 21, 2020

(54) FINGERPRINT SENSOR AND METHOD FOR PROCESSING FINGERPRINT INFORMATION

(71) Applicant: SAMSUNG ELECTRONICS CO., LTD., Suwon-si, Gyeonggi-do (KR)

(72) Inventors: Sung Hoon Son, Suwon-si (KR); Jong Seok Kim, Seoul (KR); Geun Tae Bae, Seoul (KR); Do Ha Hwang, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 149 days.

(21) Appl. No.: 15/944,862

(22) Filed: Apr. 4, 2018

(65) Prior Publication Data

US 2019/0080145 A1    Mar. 14, 2019

(30) Foreign Application Priority Data

Sep. 8, 2017    (KR) .................. 10-2017-0115322

(51) Int. Cl.
*G06K 9/32* (2006.01)
*G06K 9/00* (2006.01)

(52) U.S. Cl.
CPC ..... *G06K 9/00093* (2013.01); *G06K 9/00026* (2013.01); *G06K 9/3208* (2013.01)

(58) Field of Classification Search
CPC .......... G06K 9/00093; G06K 9/00026; G06K 9/3208; G06K 9/00006
USPC ....... 382/100, 115, 124, 125, 126; 340/5.52, 340/5.53; 356/71
See application file for complete search history.

(56) References Cited

U.S. PATENT DOCUMENTS

| | | | |
|---|---|---|---|
| 5,841,888 A | 11/1998 | Setlak et al. | |
| 7,013,030 B2 | 3/2006 | Wong et al. | |
| 7,035,441 B2* | 4/2006 | Bergenek | G06K 9/00013 340/5.53 |
| 7,194,115 B2 | 3/2007 | Uchida | |
| 7,310,433 B2* | 12/2007 | Umezaki | G06K 9/00006 382/124 |
| 8,520,903 B2 | 8/2013 | Gupta et al. | |
| 9,483,679 B2* | 11/2016 | Neskovic | G06K 9/00026 |
| 9,934,420 B2* | 4/2018 | Pyun | G06K 9/00026 |
| 10,198,615 B2* | 2/2019 | Kim | G06K 9/00013 |
| 10,244,969 B2* | 4/2019 | Lee | A61B 5/6826 |
| 10,262,186 B2* | 4/2019 | Lee | G06K 9/001 |

(Continued)

FOREIGN PATENT DOCUMENTS

JP        4426733 B2    3/2010

*Primary Examiner* — Sheela C Chawan
(74) *Attorney, Agent, or Firm* — Sughrue Mion, PLLC

(57) ABSTRACT

A method for processing fingerprint information may include obtaining an input image corresponding to at least a region of a user fingerprint, searching a memory storing at least one registered image for a reference registered image that matches the input image at least partially, determining a unique region of the input image in which the input image does not overlap with the reference registered image when the input image is aligned with the reference registered image, and, in response to a score of the unique region of the input image being greater than or equal to a predetermined reference score, classifying the input image as belonging to a same group as the reference registered image and storing the input image in the memory.

14 Claims, 16 Drawing Sheets

(56) References Cited

U.S. PATENT DOCUMENTS

| | | |
|---|---|---|
| 2004/0215615 A1 | 10/2004 | Larsson et al. |
| 2005/0270140 A1* | 12/2005 | Oh .................... G06K 9/00006 340/5.83 |
| 2016/0117545 A1 | 4/2016 | Chiang et al. |
| 2016/0314337 A1 | 10/2016 | Suh et al. |
| 2017/0032205 A1 | 2/2017 | Paul et al. |
| 2017/0046550 A1* | 2/2017 | Lee ...................... G06K 9/6203 |
| 2017/0076132 A1 | 3/2017 | Sezan et al. |

* cited by examiner

FINGERPRINT SENSOR AND METHOD FOR PROCESSING FINGERPRINT INFORMATION

CROSS-REFERENCE TO RELATED APPLICATION

This application claims priority from Korean Patent Application No. 10-2017-0115322, filed on Sep. 8, 2017 in the Korean Intellectual Property Office, the disclosure of which is incorporated herein by reference in its entirety.

BACKGROUND

1. Field

Apparatuses and methods consistent with example embodiments relate to processing fingerprint information.

2. Description of Related Art

As information technology (IT) devices, including mobile devices, become more widespread, various technologies for improving security of IT devices are being proposed. In addition to conventional password and pattern input, security technologies using an individual's biometric information have recently been used for various IT devices. Among such security technologies, a technology for detecting fingerprints has many advantages, such as manageability, security, and low cost, and it is suitable for wide application.

SUMMARY

An aspect of the present disclosure provides a method for processing fingerprint information that may increase fingerprint recognition performance.

According to an aspect of an example embodiment, a method for processing fingerprint information may include obtaining an input image corresponding to at least a region of a user fingerprint, searching a memory storing at least one registered image for a reference registered image that matches the input image at least partially, determining a unique region of the input image in which the input image does not overlap with the reference registered image when the input image is aligned with the reference registered image, and in response to a score of the unique region of the input image being greater than or equal to a predetermined reference score, classifying the input image as belonging to a same group as the reference registered image and storing the input image in the memory.

According to an aspect of an example embodiment, a method for processing fingerprint information may include classifying a plurality of registered images into a plurality of groups and storing the plurality of registered images in a memory, obtaining an input image corresponding to at least a region of a user fingerprint, searching for a first group having a reference registered image that matches the input image, among the plurality of groups, determining a common region in which registered images of the first group at least partially overlap with the input image, by matching the registered images of the first group with the input image, and determining whether to store the input image in the memory, based on a size of an area of the common region of the registered images of the first group and the input image.

According to an aspect of an example embodiment, a method for processing fingerprint information may include obtaining an input image corresponding to at least a region of a user fingerprint, searching a memory storing a plurality of registered images for a reference registered image having a highest similarity to the input image, and when an amount of free storage space of the memory is below a threshold amount, deleting the reference registered image and storing the input image.

According to an aspect of an example embodiment, an apparatus for processing fingerprint information may include a memory configured to store at least one registered image, a fingerprint sensor configured to obtain an input image through contact with a user fingerprint, and a processor configured to determine whether to store the input image in the memory by comparing the input image with the at least one registered image. The processor may be further configured to search the memory for a reference registered image that at least partially matches the input image, determine a unique region of the input image in which the input image does not overlap with the reference registered image by aligning the reference registered image with the input image, and, when a score of the unique region of the input image is greater than or equal to a predetermined reference score, classify the input image as belonging to a same group as the reference registered image and store the input image in the memory.

BRIEF DESCRIPTION OF DRAWINGS

The above, and other aspects, features, and advantages of the present disclosure will be more clearly understood from the following detailed description when taken in conjunction with the accompanying drawings, in which.

DETAILED DESCRIPTION

Hereinafter, example embodiments of the present disclosure will be described with reference to the accompanying drawings.

Figure 1:
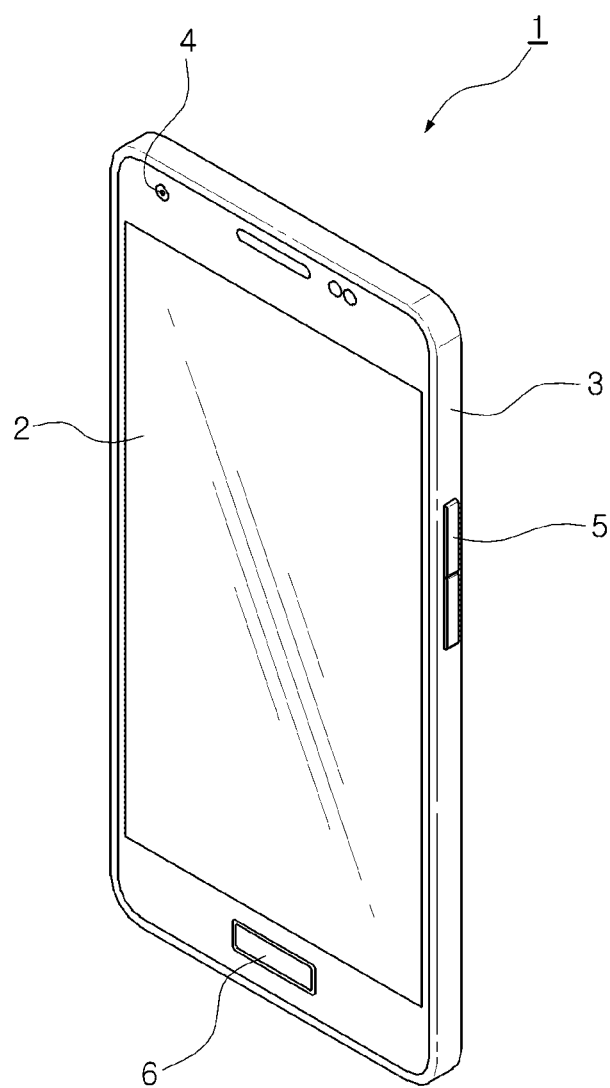
FIG. 1 is a view of an electronic device, according to an example embodiment.

FIG. 1 is a view of an electronic device, according to an example embodiment.

Referring to FIG. 1, an electronic device 1, according to an example embodiment, may be a mobile device, and the electronic device 1 may be a smartphone or a tablet personal computer (PC). The electronic device 1 may include a display 2, a housing 3, a camera 4, a buttons 5, and a fingerprint sensor 6. In the example embodiment illustrated in FIG. 1, the fingerprint sensor 6 may be integrally formed with a physical button positioned below the display 2. In another example embodiment, the fingerprint sensor 6 may be provided in a position different from that illustrated in FIG. 1, or may also be integrally formed with the display 2.

As applications for providing financial and payment services are widely used in electronic devices, such as a smartphone, a tablet PC, or the like, and applications executed on electronic devices provide a purchasing function of a particular product or service, a demand for enhanced security has increased. The fingerprint sensor 6 may be implemented to have a small size within a limited form factor, and because two different users are highly unlikely to have the same fingerprint, the fingerprint sensor 6 has been widely used in various electronic devices.

However, when the fingerprint recognition performance of the fingerprint sensor 6 is insufficient, an authenticated user may not have access to the electronic device 1 due to a false recognition of the fingerprint sensor 6. To increase the accuracy of the fingerprint sensor 6, the number of registered images stored in a memory may be increased, which may result in an increase in capacity of memory used by the fingerprint sensor 6. Thus, in an example embodiment, a method for storing a wider possible range of fingerprint images or storing as many fingerprint images as possible, using a small number of registered images, may be proposed.

The fingerprint sensor 6 may include a sensor that obtains an image of a user fingerprint in various manners, and an image processor that processes an image obtained by the sensor. A method for processing fingerprint information proposed in various example embodiments may be performed by the image processor. The image processor may be a separate processor connected to the fingerprint sensor 6, or may also be an application processor controlling the operation of the electronic device 1.

Figure 2:
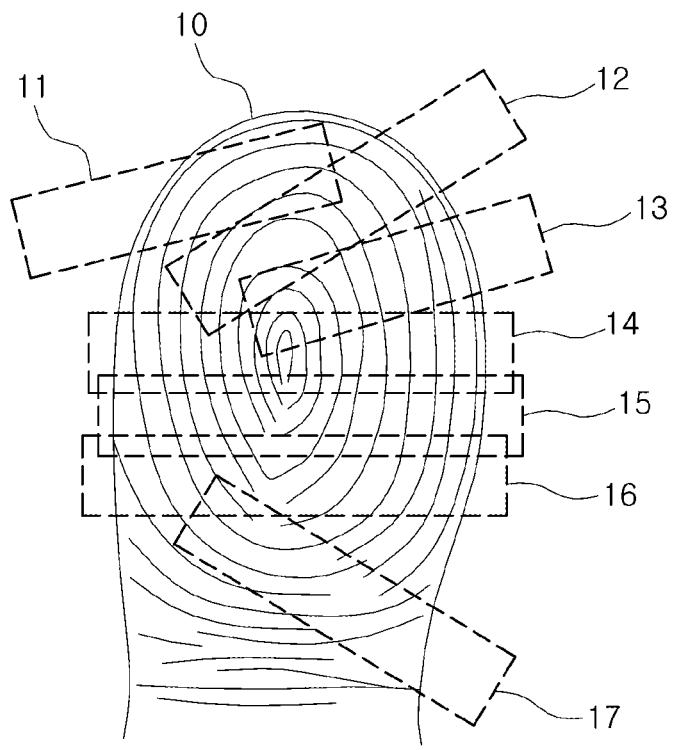
FIG. 2 is a view illustrating a fingerprint that may be recognized by a method for processing fingerprint information, according to an example embodiment.

FIG. 2 is a view illustrating a fingerprint that may be recognized by a method for processing fingerprint information, according to an example embodiment.

Referring to FIG. 2, a fingerprint 10 may be recognized by a fingerprint sensor, which may have an area that is smaller than that of the fingerprint 10. In particular, it may be difficult for a mobile device to have a fingerprint sensor having a sensing region sufficient to recognize the entirety of the fingerprint 10 within a limited space. Thus, a sensing region of the fingerprint sensor may have an area that is smaller than that of the fingerprint 10.

In this case, first to seventh fingerprint images 11 to 17 generated by the fingerprint sensor may only cover a partial region of the fingerprint 10. A registration operation of obtaining the first to seventh fingerprint images 11 to 17 corresponding to at least a partial region of the user fingerprint and storing the first to seventh fingerprint images 11 to 17 as registered images, may include obtaining and storing the first to seventh fingerprint images 11 to 17. Here, regions of the fingerprint 10 covered by the first to seventh fingerprint images 11 to 17 may partially and/or fully overlap one another. The registered images may be managed with a template, which may include at least one of the first to seventh fingerprint images 11 to 17. The template may include two or more of the first to seventh fingerprint images 11 to 17, and in an example embodiment, the fourth to sixth fingerprint images 14 to 16 having overlapping regions may be classified into a single group and may be managed.

An authentication operation of recognizing a user that inputs the fingerprint 10 may include comparing the obtained first to seventh fingerprint images 11 to 17 with the registered images. Here, according to locations, angles, or the like of the fingerprint 10 input by the user, an authenticated user may be misrecognized as an unauthenticated user, and vice versa. Thus, various methods for matching the input image with the registered images may be provided to increase the fingerprint recognition performance. Further, various methods for covering as many fingerprints as possible and a wider possible range of fingerprints, using a small number of registered images, may be provided.

Figure 3:
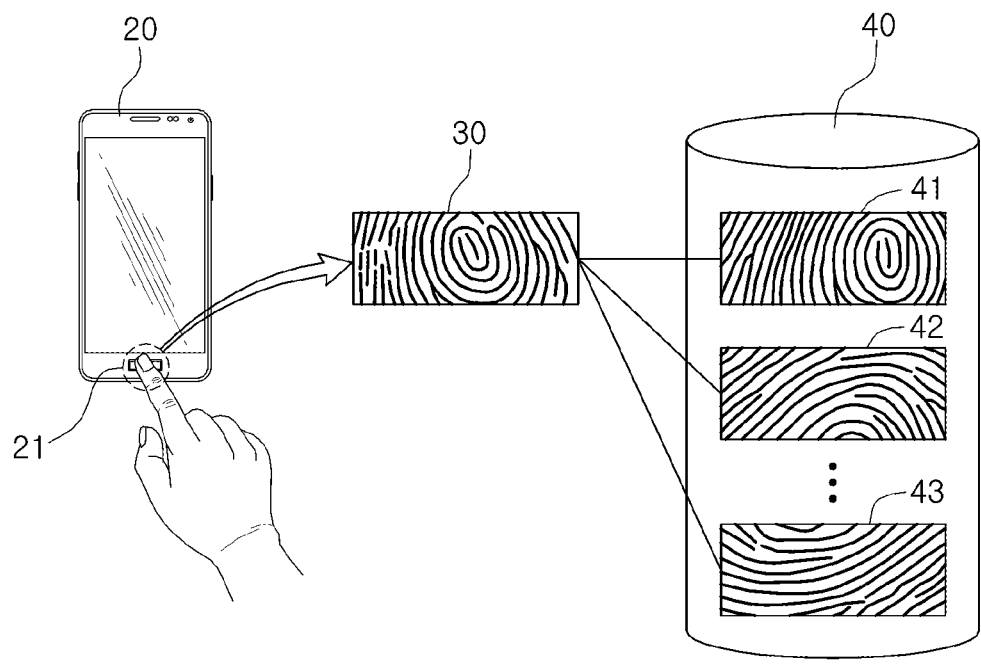
FIG. 3 is a schematic view illustrating a method for processing fingerprint information, according to an example embodiment.

FIG. 3 is a schematic view illustrating a method for processing fingerprint information, according to an example embodiment.

Referring to FIG. 3, a user may press a fingerprint thereof onto a fingerprint sensor 21 of an electronic device 20. The fingerprint sensor 21 may have a fixed sensing region, and may obtain an input image 30 from a region of a fingerprint contacting the sensing region. In an example embodiment, the input image 30 may correspond to a partial region of the fingerprint, rather than the entirety thereof. The electronic device 20 may compare a plurality of registered images 41 to 43 (e.g., reference images) stored in a memory 40 with the input image 30 to perform a user authentication procedure of verifying that a user is authenticated. Further, the electronic device 20 may perform a user registration procedure or the like of storing the input image 30 in the memory 40 as a registered image.

The memory 40 may have a limited capacity, and the number of the registered images 41 to 43 stored in the memory 40 may not be indefinitely increased. When the registered images 41 to 43 are not efficiently managed, an area of the fingerprint corresponding to the registered images 41 to 43 may be limited, or the number of fingerprints that may be authenticated using the registered images 41 to 43 may be limited. According to an example embodiment, the method for processing fingerprint information may determine whether to store an input image as a registered image by comparing the previously stored registered images 41 to 43 with the input image 30. Further, the method for processing fingerprint information may cover various possible fingerprints using a small number of registered images 41 to 43, by determining whether to store the input image 30 in the memory 40, according to the characteristics of a region in which the input image may not overlap the registered images 41 to 43.

Figure 4:
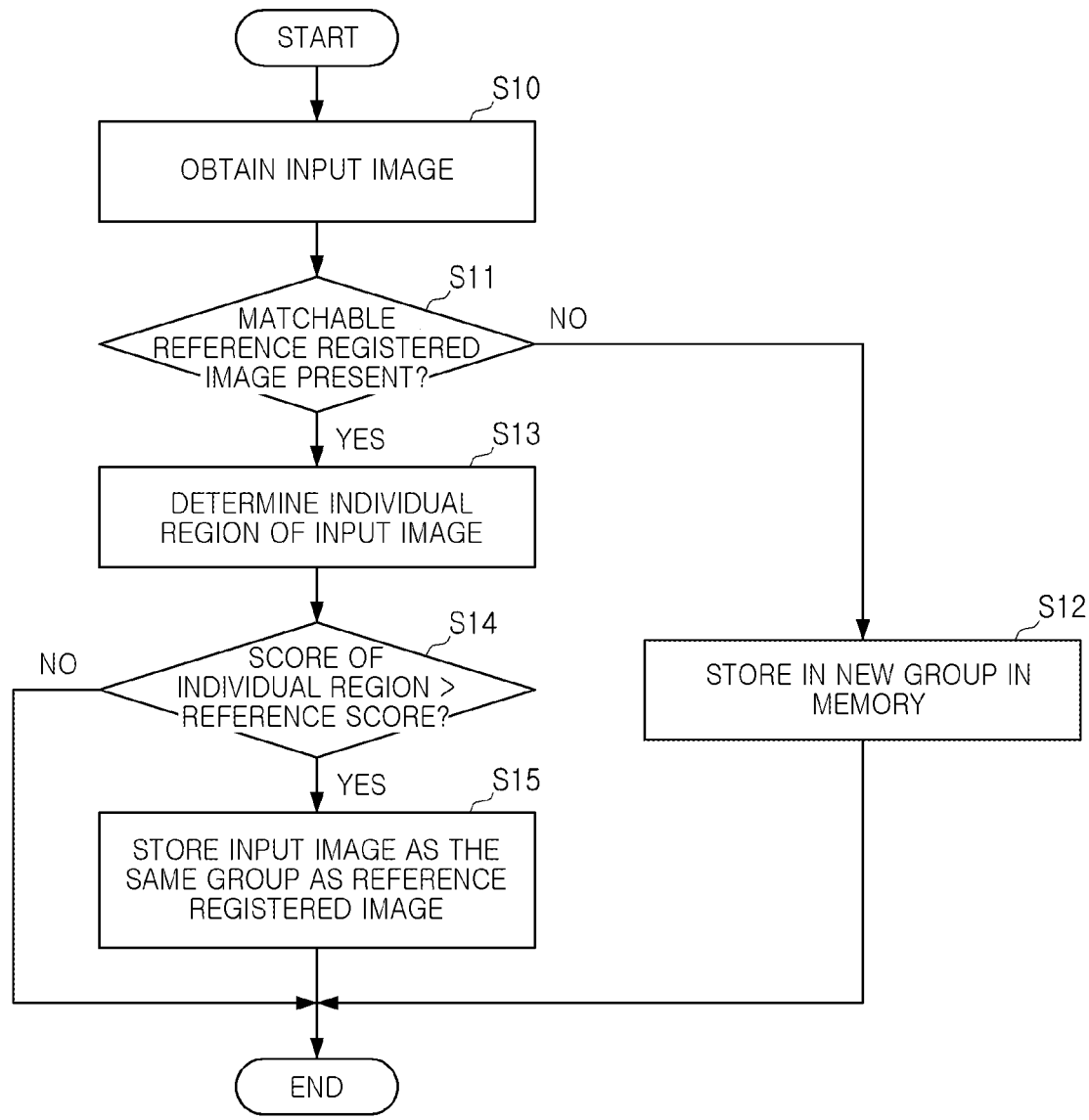
FIG. 4 is a flowchart of a method for processing fingerprint information, according to an example embodiment.

FIG. 4 is a flowchart of a method for processing fingerprint information, according to an example embodiment. In an example embodiment, the method for processing fingerprint information to be described with reference to FIG. 4 may be performed by a processor of an electronic device having a fingerprint sensor, a separate processor provided in a fingerprint sensor, or the like.

Referring to FIG. 4, a method for processing fingerprint information, according to an example embodiment, may start with a processor obtaining an input image corresponding to at least a region of a user fingerprint (S10). The processor may obtain an input image in a user registration procedure in which a user may register a new fingerprint. In S10, a fingerprint sensor may generate the input image from the at least a region of the user fingerprint coming in contact with a sensing region of the fingerprint sensor. In an example embodiment, the input image may correspond to a partial region of the fingerprint, rather than the entirety thereof.

The processor may determine whether a registered image matching the input image is present in a memory (S11).

When a plurality of registered images are present in the memory, the processor may compare each of the registered images with the input image. In an example embodiment, the processor may divide the input image and each of the registered images into a plurality of regions and then compare the respective regions with each other to search for a registered image matching the input image. The processor may select the registered image, matching the input image, from among the registered images, as a reference registered image.

When no reference registered image is identified as a result of S11, the processor may classify the input image into a new group and store the input image in the memory (S12). For example, when no reference registered image is present, the processor may determine that no registered image is classified as belonging to the same group as that of the input image, and may store the input image in the memory in a new group.

When a reference registered image is identified as a result of S11, the processor may determine an individual region of the input image by matching the input image with the registered image (S13). The individual region (also referred to as a unique region) may be defined as a region of the input image in which the input image does not overlap with any the registered images. When the input image matches the reference registered image, the processor may determine a common region in which the input image overlaps with the registered image, and the individual region in which the input image does not overlap the registered image.

The processor may calculate a score of the individual region and compare the score with a reference score (S14). In an example embodiment, the score of the individual region may be calculated based on at least one of an area of the individual region and the number of minutiae (i.e., features) present in the individual region. In an example embodiment, the individual region may be scored higher when the size of the area of the individual region is larger, and when the number of minutiae is higher. In other words, the score is positively correlated with the size of the area of the individual region and the number of minutiae.

When the score of the individual region is higher than the reference score as a result of S14, the processor may classify the input image as belonging to the same group as that of the registered image and store the input image in the memory (S15). When the score of the individual region is lower than the reference score as a result of S14, the processor may not store the input image in the memory.

In the example embodiment illustrated in FIG. 4, searching for the reference registered image may be provided to determine whether to classify the input image as belonging to the same group as that of at least a region of the previously stored registered images and to store the input image in the memory. In the example embodiment illustrated in FIG. 4, calculating the score of the individual region of the input image in which the input image does not overlap with the reference registered image, and storing the input image only when the score of the individual region is greater than or equal to the reference score may be provided not to store the input image corresponding to a region of the user fingerprint that may be sufficiently covered by the previously stored registered images. Hereinafter, a more detailed description will be provided with reference to FIGS. 5 and 6.

Figure 5:
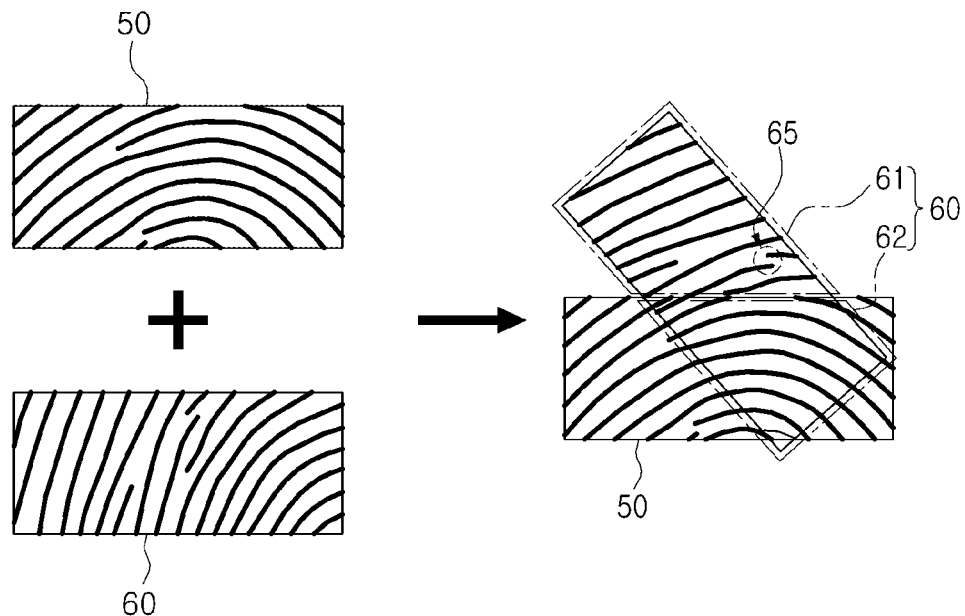
FIGS. 5 and 6 are views illustrating methods for processing fingerprint information, according to example embodiments.
Figure 6:
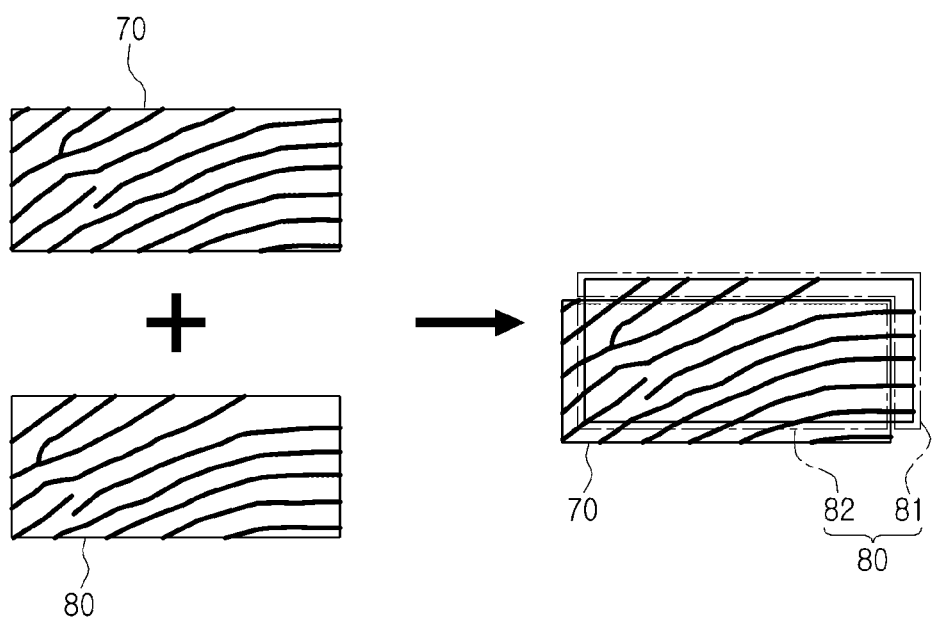

FIGS. 5 and 6 are views illustrating methods for processing fingerprint information, according to example embodiments.

Referring to FIG. 5, the method for processing fingerprint information, according to an example embodiment, may identify an individual region 61 of an input image 60 in which the input image 60 does not overlap with a reference registered image 50, and a common region 62 of the input image 60 in which the input image 60 overlaps with the reference registered image 50. When the individual region 61 is determined, a score of the individual region 61 may be calculated, based on an area of the individual region 61, the number of minutiae 65 included in the individual region 61, or the like. As mentioned above, the individual region 61 may be scored higher when the area of the individual region 61 is larger, and when the individual region 61 includes a higher number of minutiae 65.

The input image 60, according to the example embodiment illustrated in FIG. 5, may be classified as belonging to the same group as that of the reference registered image 50 and may be stored in a memory. Referring to FIG. 5, the individual region 61 of the input image 60 may occupy more than half of the total area of the input image 60, and may include the minutiae 65, thus having a high score (e.g., higher than a reference score). Thus, the input image 60, according to the example embodiment illustrated in FIG. 5, may be classified as belonging to the same group as that of the reference registered image 50, and may be stored in the memory. A correction value (e.g., offset value) required to match (e.g., align) the input image 60 with the reference registered image 50 may be stored with the input image 60. In an example embodiment, the correction value may include a first correction value required to rotate the input image 60, and a second correction value required to move the input image 60.

Referring to FIG. 6, the method for processing fingerprint information may determine an individual region 81 and a common region 82 of an input image 80 by matching (e.g., aligning) the reference registered image 70 with the input image 80. The individual region 81 may be a region in which the input image 80 does not overlap with the reference registered image 70, and the common region 82 may be a region in which the input image 80 does overlap with the reference registered image 70.

Referring to FIG. 6, the individual region 81 may have a relatively small area, as compared to the common region 82, and may include no minutiae. Thus, in the example embodiment illustrated in FIG. 6, the input image 80 may not be stored in a memory. Thus, the method for processing fingerprint information may prevent the input image 80 corresponding to a region of a user fingerprint that may be covered by the reference registered image 70 previously stored in the memory from being repeatedly stored in the memory, and may authenticate a wider possible range of fingerprints using the reference registered image 70, while efficiently managing the memory having a limited capacity.

Figure 7:
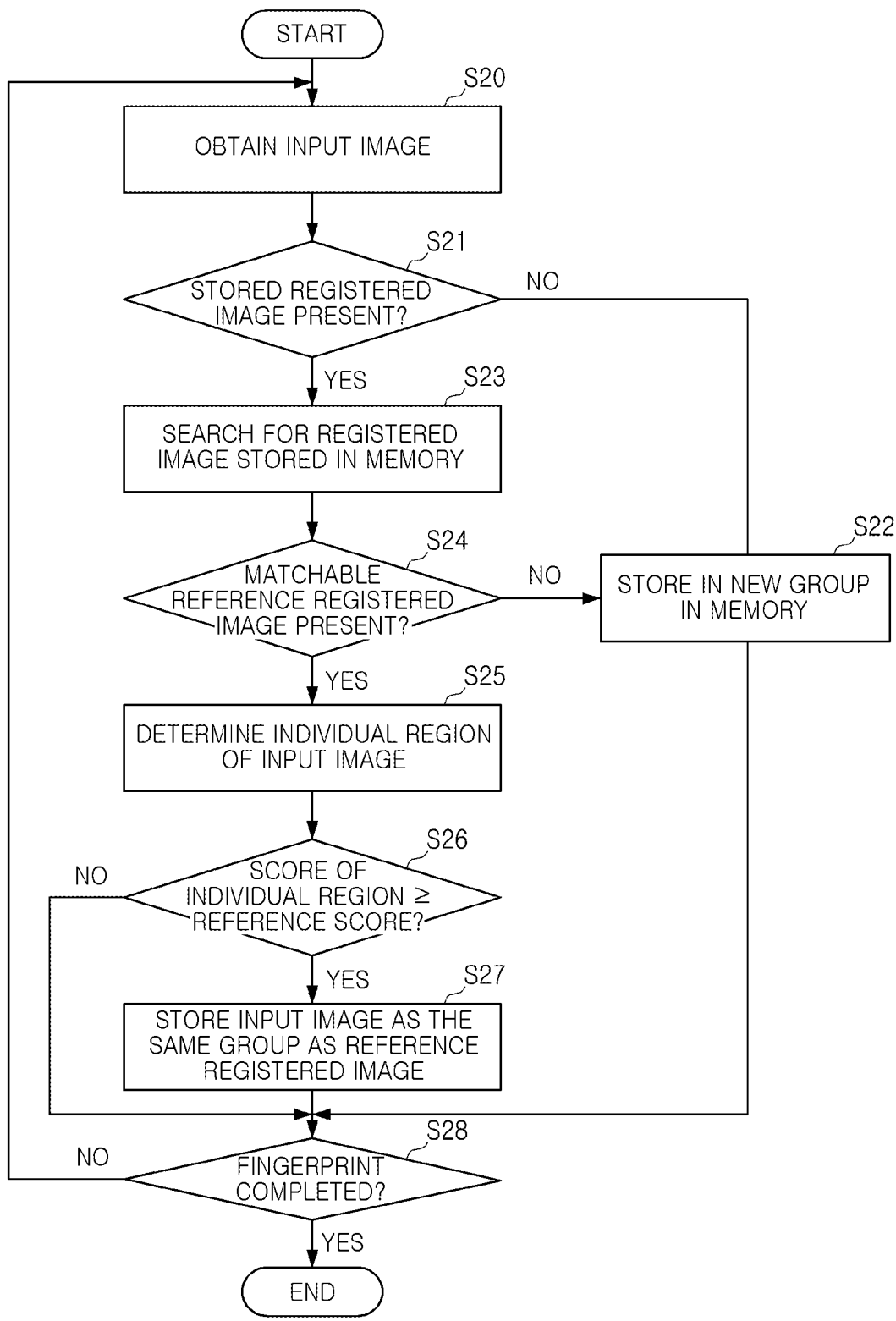
FIG. 7 is a flowchart of a method for processing fingerprint information, according to an example embodiment.

FIG. 7 is a flowchart of a method for processing fingerprint information, according to an example embodiment. In an example embodiment, the method for processing fingerprint information to be described with reference to FIG. 7 may be performed in a user registration procedure of registering a new fingerprint.

Referring to FIG. 7, the method for processing fingerprint information, according to an example embodiment, may start by obtaining an input image by a processor (S20). When a user fingerprint comes into contact with a fingerprint sensor, an electrical signal may be generated by an electrode included in the fingerprint sensor. A processor may obtain the input image corresponding to at least a region of the user fingerprint using the electrical signal.

The processor may determine whether the input image obtained in S20 is an initially obtained image (S21). As an example, when no previously stored registered image is present in a memory, the processor may determine the input image obtained in S20 as an initially obtained image. When the input image obtained in S20 is an initially obtained image, the processor may store the input image in the memory and may classify the input image into a new group (S22).

When the input image obtained in S20 is not an initially obtained image, the processor may search for a reference registered image matching the input image (S24) by retrieving registered images stored in the memory (S23). When no reference registered image is present as a result of S24, the processor may classify the input image into a new group and store the input image in the memory (S22). For example, when a registered image matching the input image, of the registered images stored in the memory is not identified, the processor may classify the input image into a new group different from that of the registered images.

When a reference registered image matching the input image is identified as a result of S24, the processor may determine an individual region of the input image in which the input image does not overlap with the reference registered image by matching the input image with the reference registered image (S25). The input image may have a common region in which the input image overlaps with the reference registered image, and the individual region in which the input image does not overlap with the reference registered image. The processor may calculate a score of the individual region, based on the size of an area of the individual region and/or the number of minutiae present in the individual region, and may compare the score with a reference score (S26).

When the score of the individual region of the input image is lower than the reference score as a result of S26, the processor may not store the input image in the memory. When the score of the individual region of the input image is greater than or equal to the reference score, the processor may classify the input image as belonging to the same group as that of the reference registered image, and may store the input image in the memory (S27). For example, in an example embodiment, the processor may not unconditionally store an input image, obtained in storing a registered image for authenticating a user fingerprint, in the memory. Instead, the processor may authenticate a wide range of fingerprint or a large number of fingerprints, using a smaller possible number of registered images, by comparing a newly obtained input image with previously stored registered images and not storing an input image that is similar to the previously stored registered images.

FIGS. 8 through 11 are views illustrating a method for processing fingerprint information, according to an example embodiment.

Figure 8:
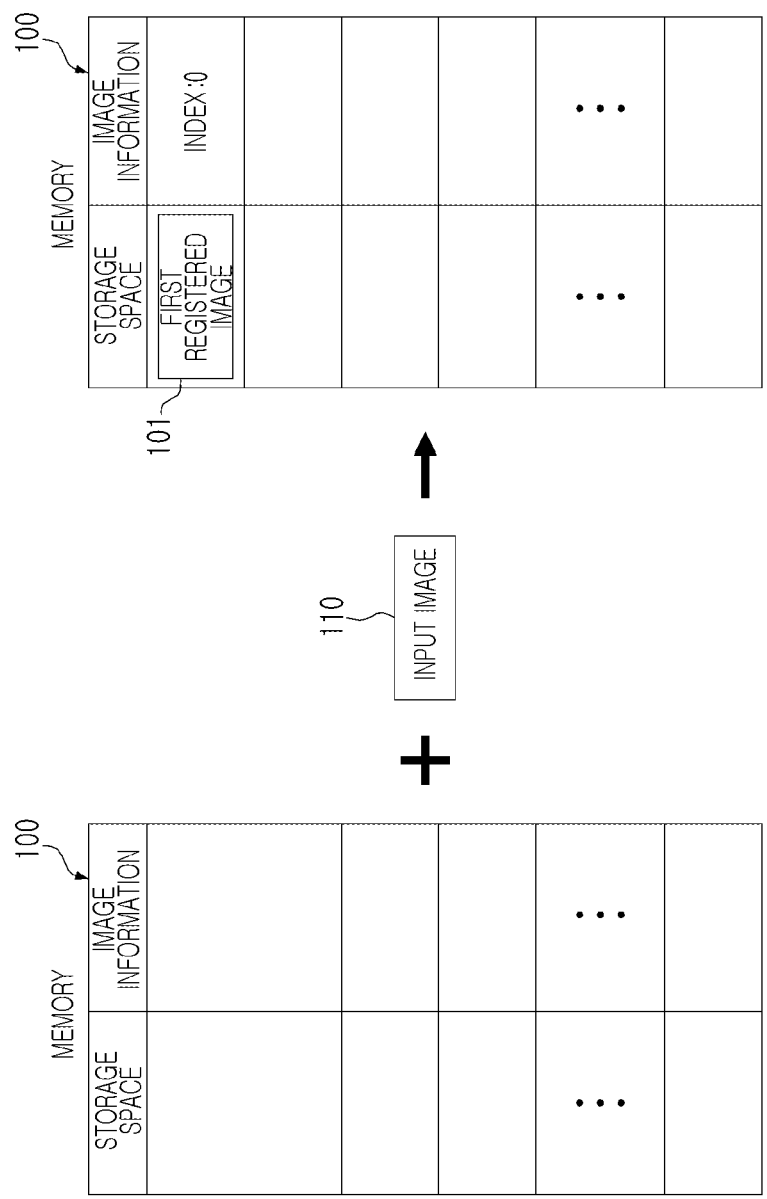
FIGS. 8 through 11 are views illustrating a method for processing fingerprint information, according to an example embodiment.

Referring to FIG. 8, a memory 100 may store registered images and image information on each of the registered images. The image information may include index information required to classify the registered images into a plurality of groups, a correction value (e.g., offset value) required to match or align the registered images belonging to the same group, or the like.

When obtaining an input image 110 while no previously stored registered image is present in the memory 100, a processor may assign a new index value to the input image 110 and store the input image 110 in the memory 100. The input image 110 may be stored in memory 100 as a first registered image 101.

Figure 9:
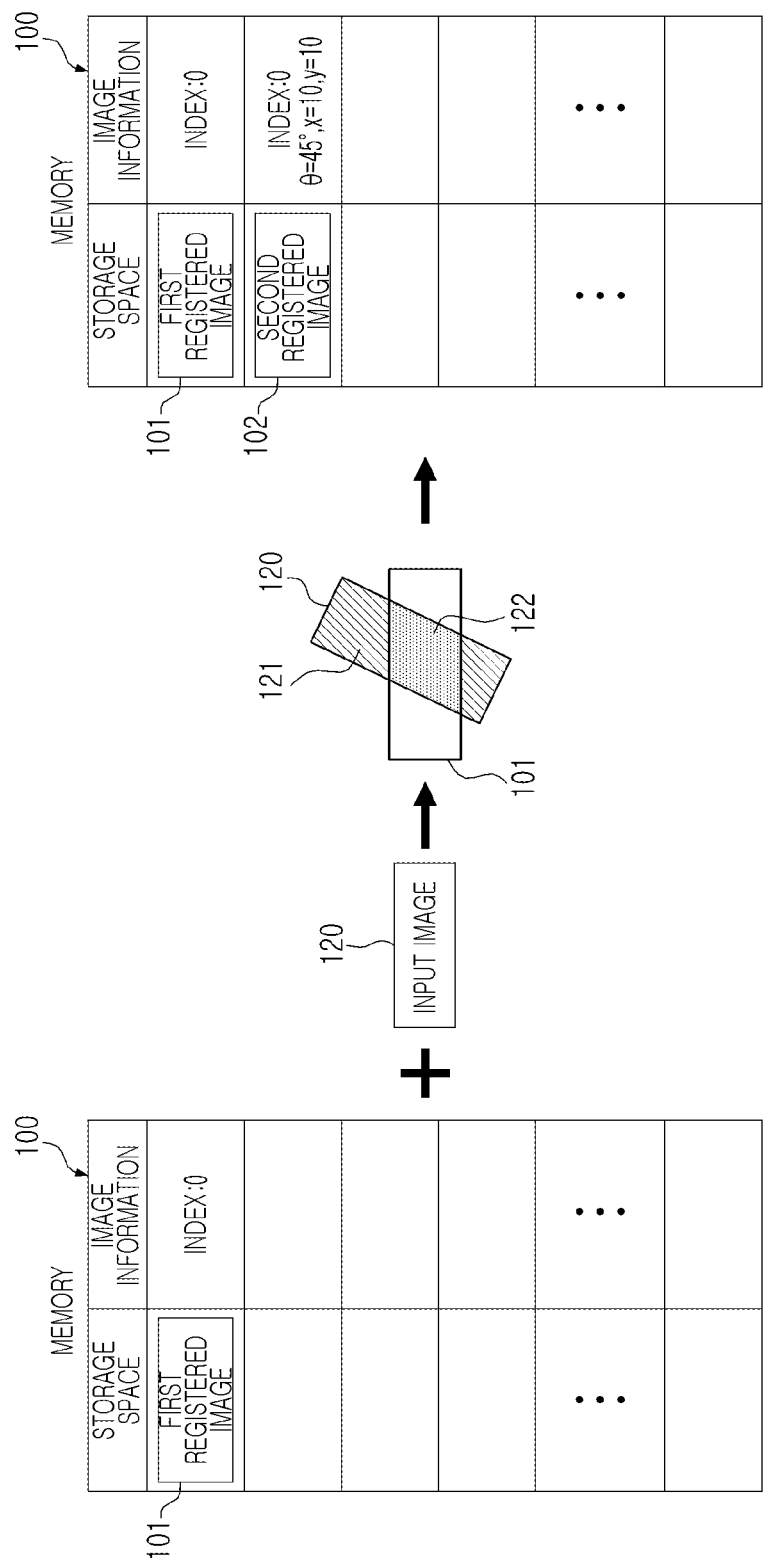

Referring to FIG. 9, while the first registered image 101 is stored in the memory 100, the processor may obtain a new input image 120. The processor may compare the input image 120 with the first registered image 101 to determine whether the input image 120 matches the first registered image 101. In an example embodiment, the processor may calculate a first correction value (e.g., angle) required for rotational matching of the input image 120 and the first registered image 101, in order to determine whether the input image 120 matches the first registered image 101. When the first correction value is calculated, the processor may match the input image 120 with the first registered image 101 by rotating the input image 120, based on the first correction value, and by calculating a second correction value required for vertical/horizontal matching of the input image 120 and the first registered image 101 and moving the input image 120. Here, each of the input image 120 and the first registered image 101 may be divided into a plurality of regions first to reduce computational complexity.

In the example embodiment illustrated in FIG. 9, the first registered image 101 may match the input image 120. Referring to FIG. 9, the input image 120 may include a common region 122 in which the input image 120 overlaps with the first registered image 101, and an individual region 121, which excludes the common region 122. The processor may calculate a score of the individual region 121 in which the input image 120 does not overlap the first registered image 101. In an example embodiment, the score of the individual region 121 may be determined, based on the size of an area of the individual region 121 and/or the number of minutiae included in the individual region 121.

In the example embodiment illustrated in FIG. 9, when the area of the individual region 121 is sufficiently large or a minutia is present in the individual region 121, the processor may store the input image 120 in the memory 100 as a second registered image 102. The input image 120 may be an image that may match the first registered image 101, and thus the second registered image 102 may be granted the same index value as that of the first registered image 101. For example, the processor may classify the first registered image 101 and the second registered image 102 as belonging to the same group and store the first registered image 101 and the second registered image 102 in the memory 100. When storing the second registered image 102 in the memory 100, the processor may store correction values required to match the first registered image 101 with the second registered image 102 in the memory 100 as image information, together with the second registered image 102. For example, the second registered image 102 may be stored with a first correction value (e.g., rotational angle) of 45° and second correction values (e.g., X-Y coordinates) of x=10, y=10.

Figure 10:
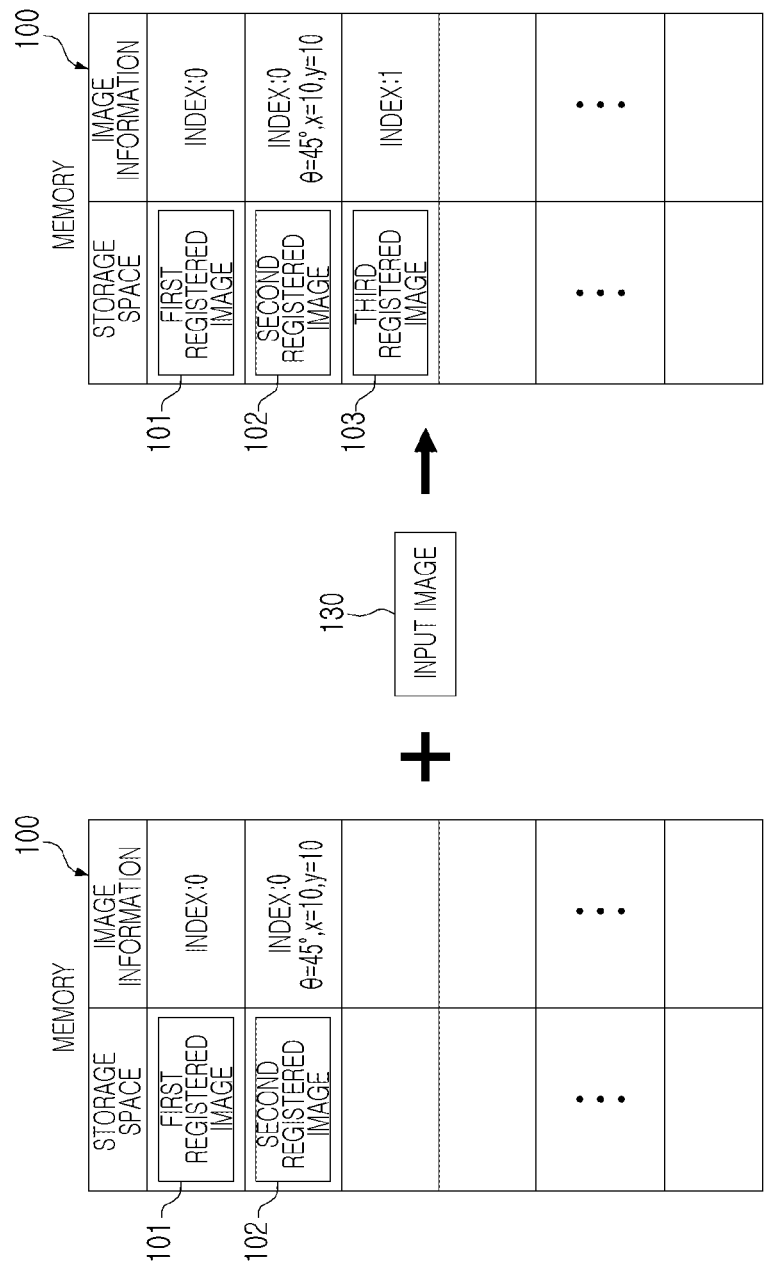

Referring to FIG. 10, while the first registered image 101 and the second registered image 102 are stored in the memory 100, the processor may obtain a new input image 130. The processor may determine whether a reference registered image matching the input image 130 is present in the first and second registered images 101 and 102 by comparing the input image 130 with each of the first registered image 101 and the second registered image 102.

In the example embodiment illustrated in FIG. 10, the input image 130 may not match the first registered image 101 and the second registered image 102. For example, a reference registered image may not be retrieved from the memory 100. In this case, the processor may classify the input image 130 as belonging to a group different from that of the first registered image 101 and the second registered image 102, and may store the input image 130 in the memory 100 as a third registered image 103. Referring to FIG. 10, the third registered image 103 may have an index value different from those of the first registered image 101 and the second registered image 102.

Figure 11:
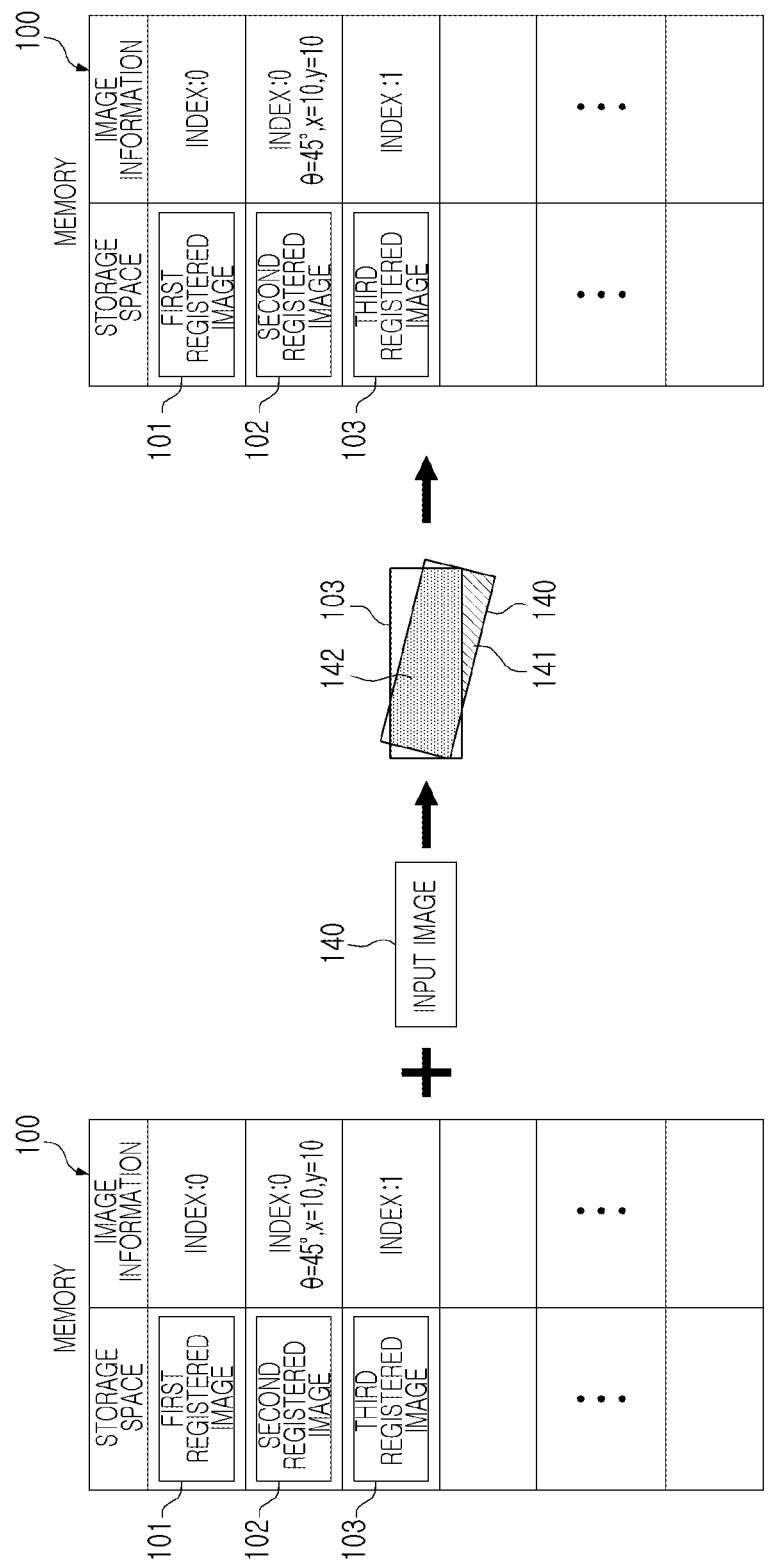

Referring to FIG. 11, while the first to third registered images 101 to 103 are stored in the memory 100, the processor may obtain a new input image 140. The processor may compare the input image 140 with each of the first to third registered images 101 to 103, and may determine whether a reference registered image matching the input image 140 is present in the first to third registered images 101 to 103.

As described above, the processor may compare the input image 140 with each of the first to third registered images 101 to 103 to calculate correction values required for rotational matching and vertical/horizontal matching of the input image 140 and each of the first to third registered images 101 to 103. In the example embodiment illustrated in FIG. 11, the input image 140 may match the third registered image 103. For example, the third registered image 103 may be selected as a reference registered image. The processor may determine a common region 142 of the input image 140 in which the input image 140 overlaps with the third registered image 103, and an individual region 141 of the input image 140 in which the input image 140 does not overlap with the third registered image 103.

In the example embodiment illustrated in FIG. 11, the common region 142 of the input image 140 may have an area relatively greater than that of the individual region 141. As long as no minutia is present in the individual region 141, the processor may determine that the similarity between the input image 140 and the third registered image 103 is significantly high. In this case, the processor may determine fingerprint information included in the input image 140 as being sufficiently covered by the third registered image 103. Thus, the processor may not store the input image 140 in the memory 100. As described above, when obtaining the input image 140 that is similar to the first to third registered images 101 to 103 previously stored in the memory 100, the processor may efficiently manage a storage space of the memory 100 by not storing the input image 140 in the memory 100.

Figure 12:
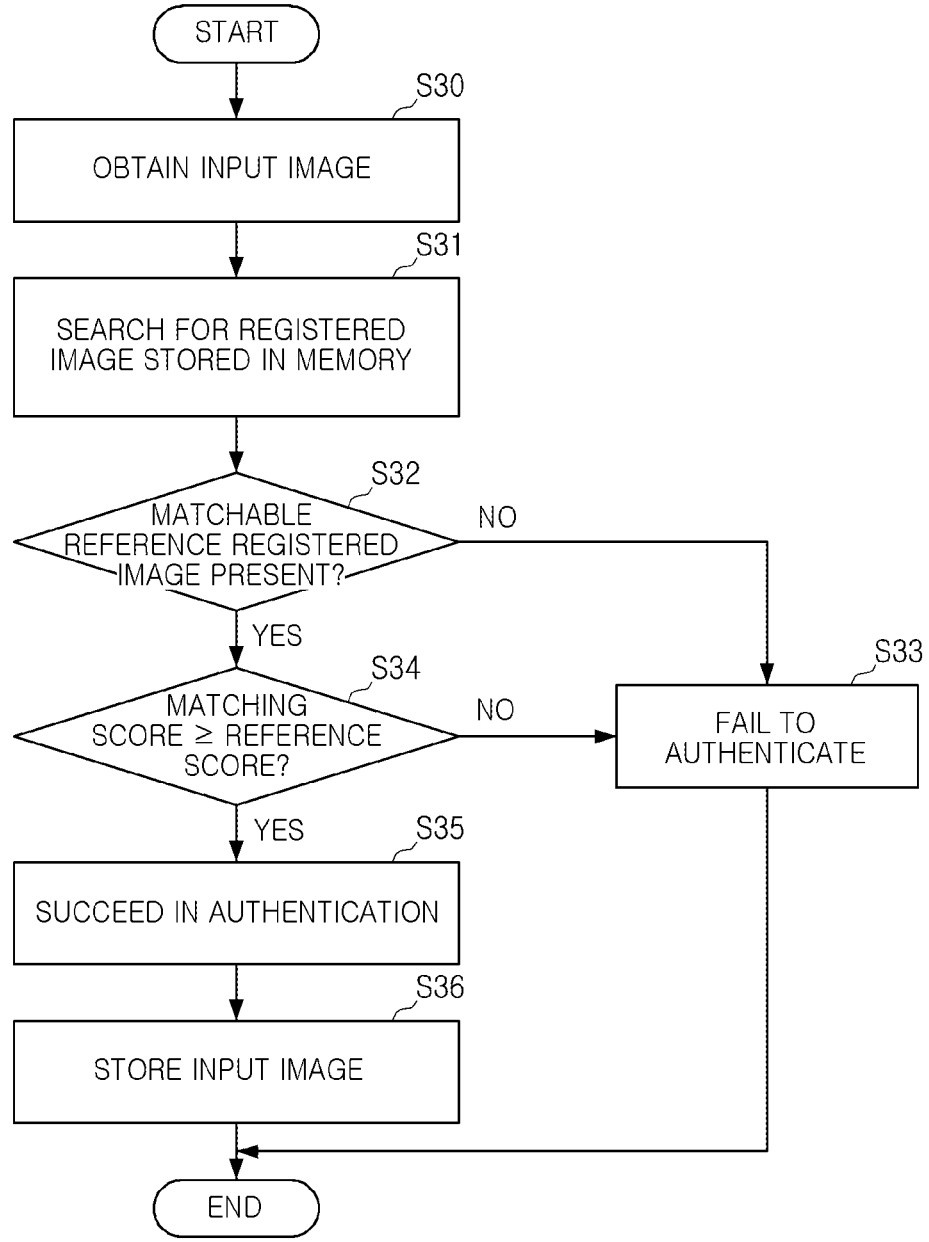
FIGS. 12 and 13 are flowcharts of methods for processing fingerprint information, according to example embodiments.
Figure 13:
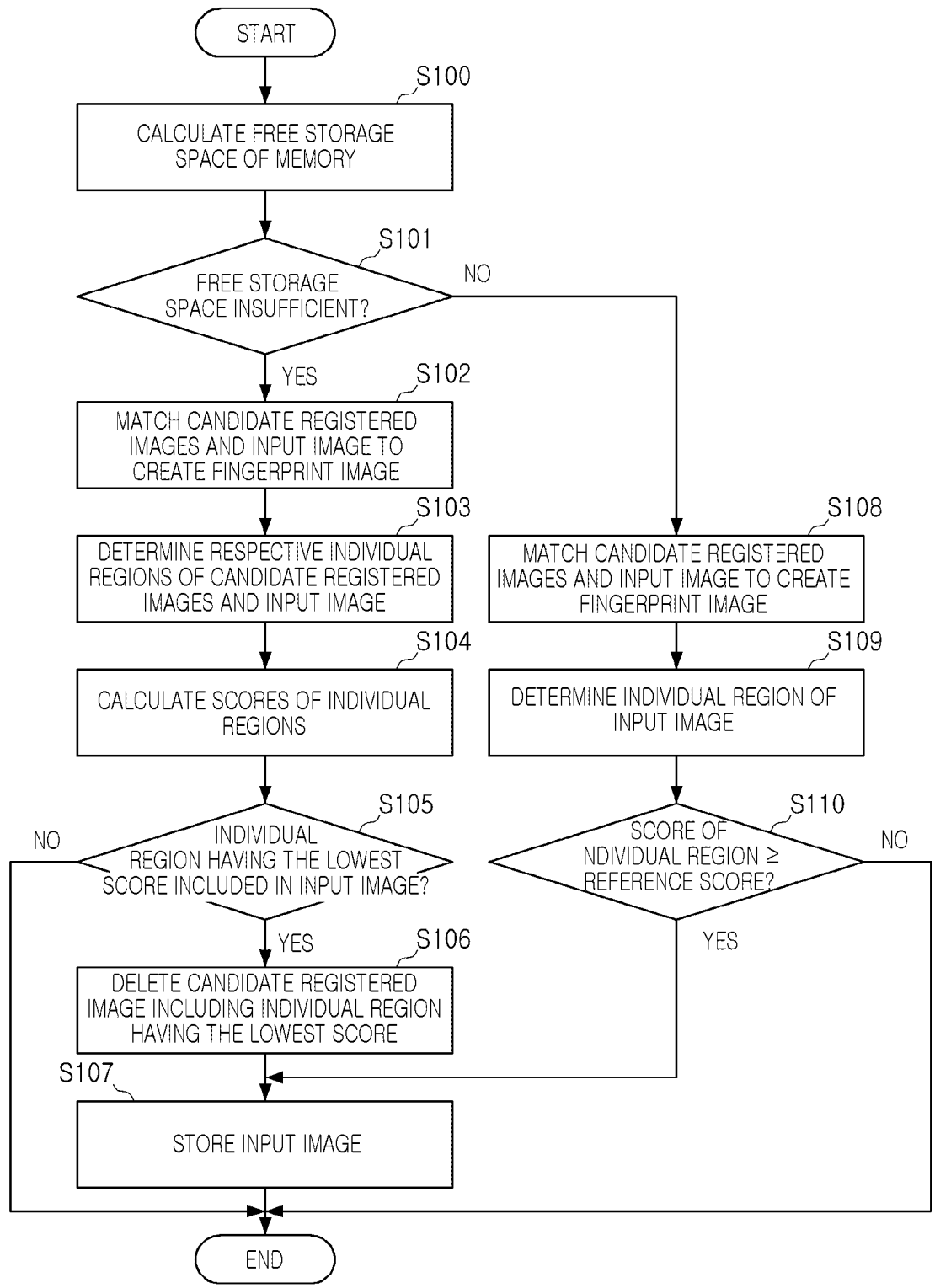

FIGS. 12 and 13 are flowcharts of methods for processing fingerprint information, according to example embodiments. The methods, according to the example embodiments illustrated in FIGS. 12 and 13, may be performed in a user authentication procedure of authenticating a user by comparing an input image obtained by a processor with registered images.

Referring to FIG. 12, the method for processing fingerprint information, according to an example embodiment, may start by obtaining an input image by a processor (S30). The input image may be an image corresponding to at least a region of a user fingerprint contacting a fingerprint sensor. The processor may search for registered images stored in a memory (S31), and may determine whether a reference registered image matching the input image is present in the registered images (S32).

When no reference registered image is identified as being present as a result of S32, the processor may determine that the user authentication has failed and may terminate the user authentication procedure (S33). When a reference registered image is identified as being present as a result of S32, the processor may match the input image with the reference registered image to calculate a matching score from a common region in which the input image overlaps with the reference registered image, and may compare the matching score with a reference score (S34).

The processor may compare the input image with the reference registered image to calculate correction values required for rotational matching and vertical/horizontal matching of the input image and the reference registered image. The processor may rotate and vertically or horizontally move any one of the input image and the reference registered image, based on the correction values, to match the input image with the reference registered image, and may calculate a normalized cross-correlation (NCC) score from the common region in which the input image may overlap the reference registered image, the number of minutiae included in the common region, or the like, to produce the matching score.

When the matching score is lower than the reference score as a result of S34, the processor may determine that the user authentication has failed and may terminate the user authentication procedure (S33). When the matching score is greater than or equal to the reference score as a result of S34, the processor may determine that the user authentication has succeeded (S35).

In an example embodiment, the processor may store the input image that has been successfully authenticated in the user authentication procedure as a registered image (S36), and may use the registered image in a subsequent user authentication procedure or the like. Here, the processor may only store an input image that satisfies additional conditions as a registered image, rather than the input image that has been successfully authenticated in the user authentication procedure. In an example embodiment, the processor may perform a procedure of comparing the matching score with a reference score higher than that used in S34 and storing the input image as a registered image according to a result of the comparison. Hereinafter, a method for storing an input image that has succeeded in the user authentication as a registered image will be described with reference to FIG. 13.

Referring to FIG. 13, a method for processing fingerprint information, according to an example embodiment, may start by calculating free storage space of a memory in which registered images are stored (S100). In a user authentication method using a fingerprint, the capacity of a memory storing a registered image may be limited. In an example embodiment, application of different methods for processing fingerprint information according to free storage space of the memory may allow the memory to be efficiently managed and an authentication procedure for various fingerprints to be processed using a small number of registered images.

The processor may determine whether the free storage space of the memory is insufficient (S101). When it is determined that the free storage space of the memory is insufficient as a result of S101, the processor may determine whether to replace at least one of the registered images stored in the memory with an input image that has succeeded in the user authentication.

When the free storage space of the memory is insufficient, the processor may match the registered images with the input image to generate a fingerprint image (S102). Here, candidate registered images matching the input image may be a reference registered image used to authenticate the input image, and registered images included in the same group as that of the reference registered image. For example, first to sixth registered images may be present in the memory, the first to third registered images may be classified into a first group, and the fourth to sixth registered images may be classified into a second group. When the input image matches the third registered image to succeed in the user authentication, the processor may select the first to third registered images belonging to the first group as candidate registered images, and may try to match the input image with the candidate registered images to generate a fingerprint image.

The processor may determine an individual region of each of the input image and the candidate registered images included in the fingerprint image (S103). The individual region may be defined as a region which does not overlap with another image, of each of the input image and the candidate registered images. The processor may calculate a score of the individual region of each of the input image and the candidate registered images (S104), and may determine whether an individual region having the lowest score is included in the input image (S105). In an example embodiment, the score of the individual region of each of the input image and the candidate registered images may be calculated, based on an area of the individual region and/or the number of minutiae included in the individual region.

When the score of the individual region of the input image is lower than that of the individual region of each of the candidate registered images as a result of S105, the processor may not store the input image in the memory. When the score of the individual region of the input image is lowest, the processor may determine that a region of the user fingerprint corresponding to the input image may be covered by the candidate registered images previously stored in the memory. Thus, a limited storage space of the memory may be efficiently managed by not storing the input image in the memory.

When an individual region having the lowest score is included in any one of the candidate registered images as a result of S105, the processor may delete a candidate registered image that includes the individual region having the lowest score (S106), and may store the input image in the memory (S107). For example, the candidate registered image that includes the individual region having the lowest score may be replaced with the input image. Here, the input image may be classified as belonging to the same group as that of the candidate registered images used to generate the fingerprint image in S102, and may be stored in the memory.

In an example embodiment, even in the case in which the individual region having the lowest score is included in the candidate registered image, when the number of registered images included in the group to which the candidate registered image belongs is less than a threshold value, the processor may not delete the candidate registered image. Further, when the candidate registered image that includes the individual region having the lowest score is an image input in a user registration procedure, the candidate registered image may not be replaced with the input image. This may be provided to increase stability of the user registration and authentication procedures.

When the individual region having the lowest score is included in any one of the candidate registered images, the processor may cover a wider range of user fingerprint using the registered images stored in the memory by replacing, with the input image, the candidate registered image that includes the individual region having the lowest score. Moreover, the processor may increase fingerprint recognition performance while retaining the free storage space of the memory as is, by deleting, from the memory, the candidate registered image that includes the individual region having the lowest score and storing the input image in place of the candidate registered image.

When it is determined that the free storage space of the memory is sufficient as a result of S101, the processor may try to match the candidate registered images with the input image to generate a fingerprint image (S108). The processor may select, as the candidate registered images, a reference registered image used to authenticate the input image, and registered images included in the same group as that of the reference registered image.

When the fingerprint image is generated, the processor may determine an individual region of the input image (S109). The individual region may be defined as a region of the input image in which the input image does not overlap with the candidate registered images. The processor may calculate a score of the individual region, based on the size of an area of the individual region, the number of minutiae present in the individual region, or the like, and may compare the score of the individual region with a reference score (S110).

When the score of the individual region is greater than or equal to the reference score as a result of S110, the processor may store the input image in the memory (S107). Because this is a case in which the free storage space of the memory is sufficient, the processor may additionally store the input image in the memory without a procedure of deleting the candidate registered images previously stored in the memory. When the score of the individual region is lower than the reference score as a result of S110, the processor may determine that a region of the user fingerprint corresponding to the input image may be covered by the candidate registered images previously stored in the memory. Thus, the processor may not store the input image.

FIGS. 14 through 17 are views illustrating methods for processing fingerprint information, according to example embodiments.

Figure 14:
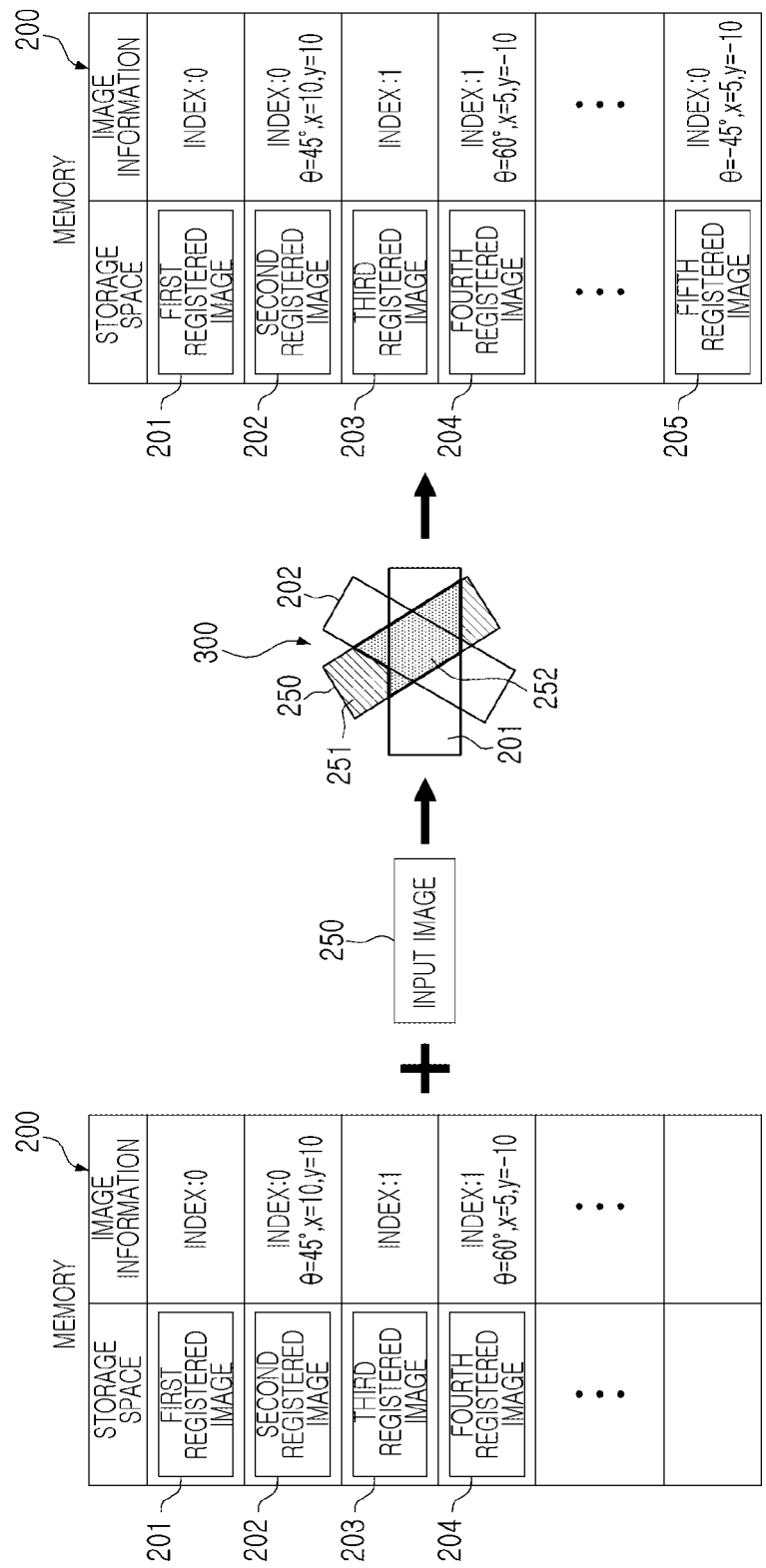
FIGS. 14 through 17 are views illustrating methods for processing fingerprint information, according to example embodiments.

With reference to an example embodiment illustrated in FIG. 14, first to fourth registered images 201 to 204 may be stored in a memory 200, which may have a sufficient free storage space. The processor may determine whether to additionally store an input image 250 that has succeeded in user authentication in the memory 200. In the example embodiment illustrated in FIG. 14, it may be assumed that in a user authentication procedure, the input image 250 has succeeded in the user authentication by matching a first registered image 201. For example, the first registered image 201 may be selected as a reference registered image in the user authentication procedure.

The processor may match the input image 250, the first registered image 201, and a second registered image 202, belonging to the same group as that of the first registered image 201, to generate a fingerprint image 300. For example, in the example embodiment illustrated in FIG. 14, the first registered image 201 and the second registered image 202 may be selected as candidate registered images. The processor may determine an individual region 251 and a common region 252 of the input image 250, with reference to the fingerprint image 300.

The common region 252 may be a region of the input image 250 in which the input image 250 overlaps with at least one of the first and second registered images 201 and 202, and the individual region 251 may be a remaining region of the input image that excludes the common region 252. The processor may determine whether to store the input image 250 in the memory 200 as a new fifth registered image 205, based on the size of an area of the individual region 251, the number of minutiae included in the individual region 251, or the like. In an example embodiment, when the size of the area of the individual region 251 is greater than or equal to a reference area or a minutia is included in the individual region 251, the processor may store the input image 250 in the memory 200 as the fifth registered image 205.

The fifth registered image 205 may be classified as belonging to the same group as that of the first and second registered images 201 and 202 selected as the candidate registered images, and may be stored. Further, correction values required to match the fifth registered image 205 with the first and second registered images 201 and 202 may be stored in the memory 200 as image information on the fifth registered image 205. In the example embodiment illustrated in FIG. 14, the correction values for the fifth registered image 205 may be values required to match the first registered image 201 with the fifth registered image 205 which may be used to authenticate the input image 250.

Figure 15:
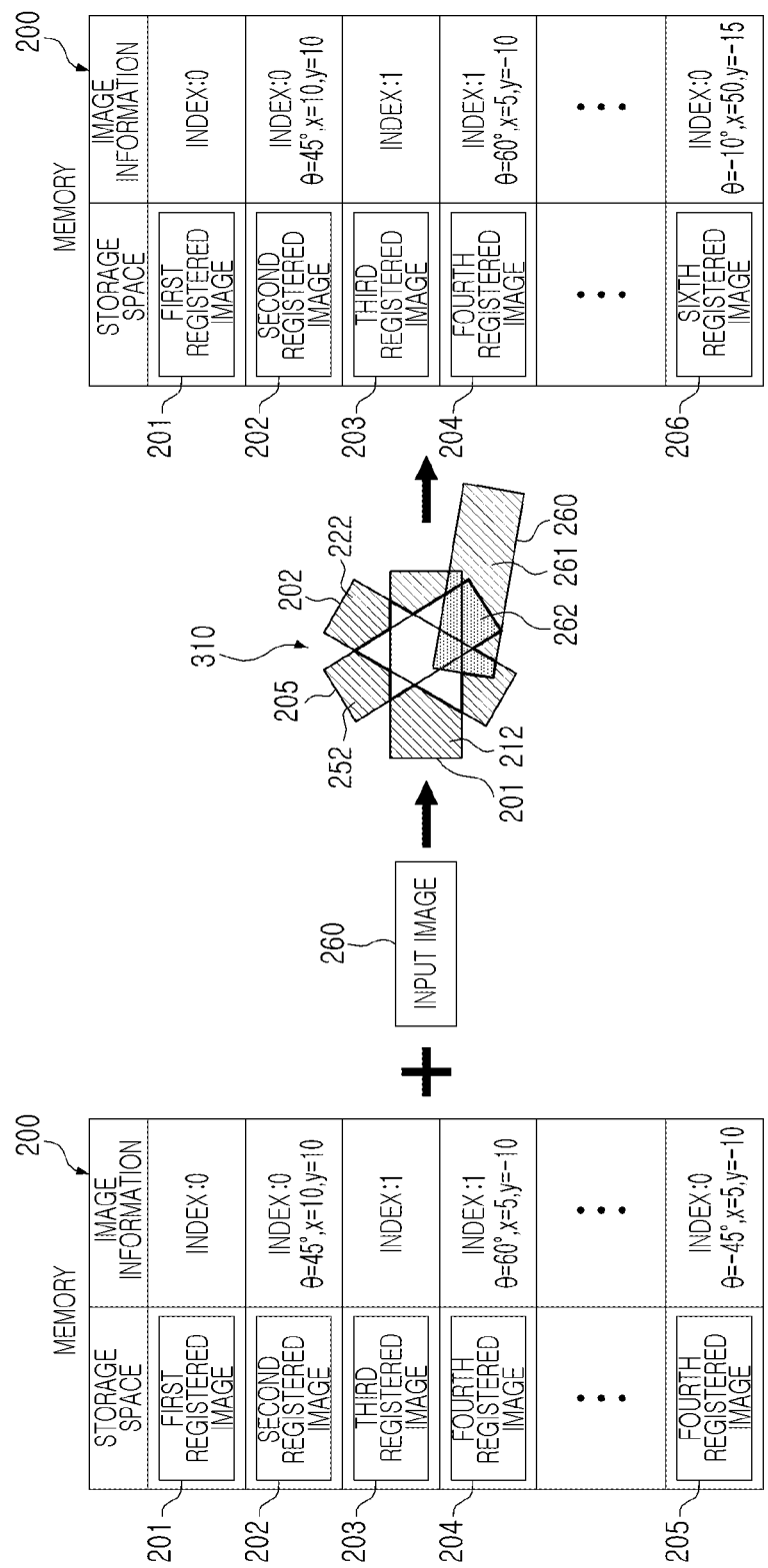

With reference to an example embodiment illustrated in FIG. 15, the first to fifth registered images 201 to 205 may be stored in the memory 200, which may have insufficient free storage space. Thus, the processor may delete a portion of the first to fifth registered images 201 to 205 stored in the memory 200, and may determine whether to store, in the memory, the input image 250 that has succeeded in the user authentication. In the example embodiment illustrated in FIG. 15, it may be assumed that in the user authentication procedure, the input image 250 has succeeded in the user authentication by matching the first registered image 201. For example, the first registered image 201 may be selected as a reference registered image in the user authentication procedure. Further, the first registered image 201, and the second and fifth registered images 202 and 205 belonging to the same group as that of the first registered image 201 may be selected as candidate registered images.

The processor may match, with an input image 260, the first, second, and fifth registered images 201, 202, and 205 selected as the candidate registered images to generate a fingerprint image 310. The processor may determine an individual region of each of the first, second, and fifth registered images 201, 202, and 205 and the input image 260 included in the fingerprint image 310. The individual region may be defined as a region of each of the first, second, and fifth registered images 201, 202, and 205 and the input image 260 in which each of the first, second, and fifth registered images 201, 202, and 205 and the input image 260 may not overlap the other images 201, 202, 205, and 260.

The processor may calculate a score of the individual region of each of the first, second, and fifth registered images 201, 202, and 205 and the input image 260. Similar to the above-mentioned description, the score of the individual region may be calculated, based on an area of the individual region, the number of minutiae present in the individual region, or the like. As an example, the larger the area size of the individual region and the higher the number of minutiae included in the individual region, the higher the score of the individual region may be.

The processor may determine an image that includes an individual region having the lowest score, of the first, second, and fifth registered images 201, 202, and 205 and the input image 260. In the example embodiment illustrated in FIG. 15, an individual region 261 of the input image 260 may have a relatively high score, whereas an individual region 252 of the fifth registered image 205 may have a relatively low score. Thus, the processor may determine that a region of the fingerprint image corresponding to the fifth registered image 205 may be covered by the first and second registered images 201 and 202 and the input image 260.

The processor may delete the fifth registered image 205 from the memory 200, and may store the input image 260 in a storage space of the memory 200, gained by deleting the fifth registered image 205, as a sixth registered image 206. Here, the processor may classify the sixth registered image 206 as belonging to the same group as that of the first and second registered images 201 and 202. Further, the processor may store a correction value, required to match the sixth registered image 206 with the first and second registered images 201 and 202, in the memory 200 as the image information.

The processor may continue to update the registered images stored in the memory 200 through the same procedure as that mentioned above. In particular, the processor may determine whether to replace a previously stored registered image with a new input image, based on a score of an individual region of an input image in which the input image may not overlap another registered image. Thus, the processor may increase fingerprint recognition performance by covering a wider possible range of fingerprints using the registered images stored in the memory 200 having a limited capacity.

When the processor selectively deletes a previously stored registered image in order to store an input image that has succeeded in the user authentication, a registered image stored in the memory in a user registration procedure may be excluded from being deleted. This may be provided to prevent the registered images from being contaminated by an input image which has passed through the user authentication procedure, even in a case in which a user is not authenticated.

Figure 16:
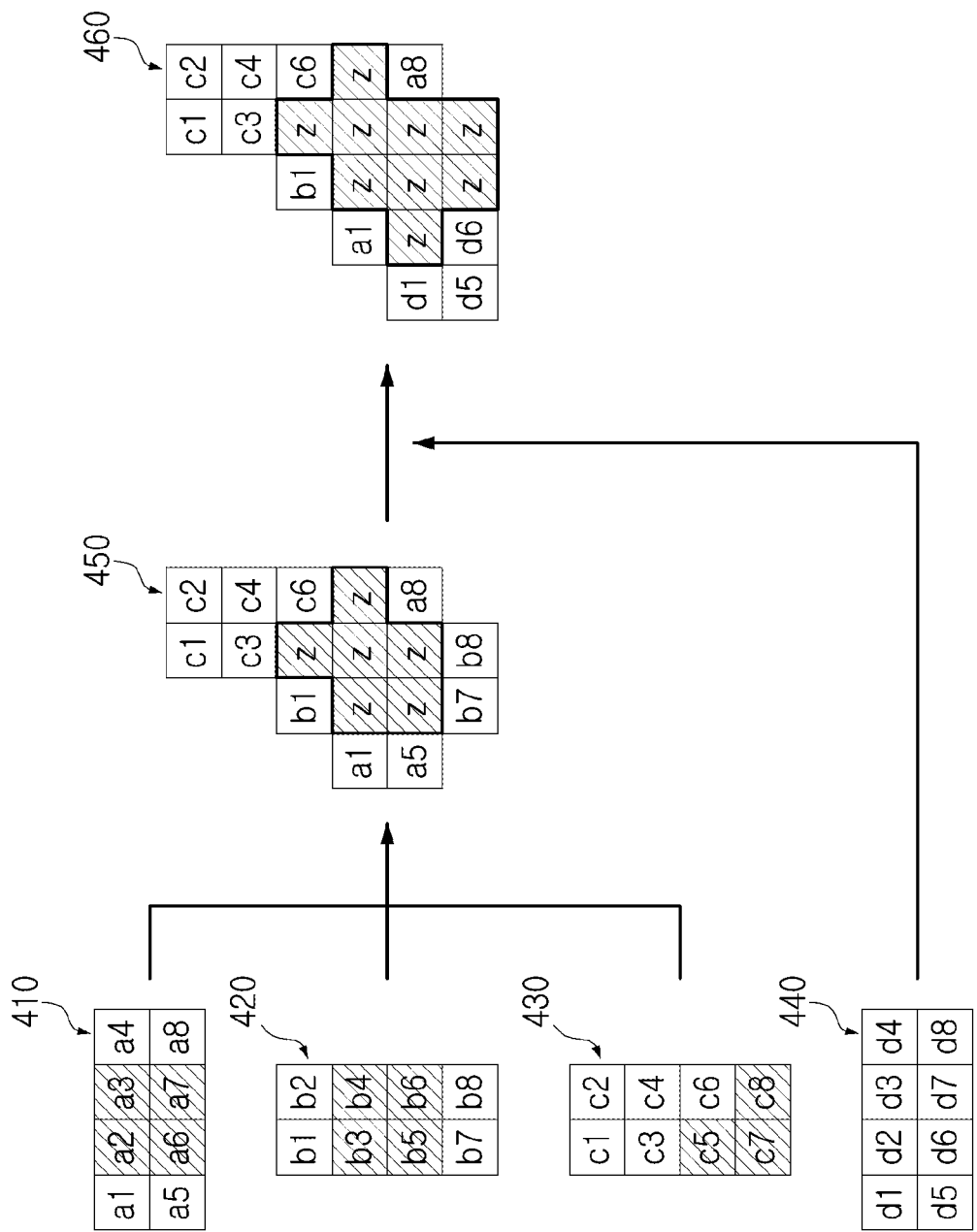

Referring to FIG. 16, first to third registered images 410 to 430 may be stored in the memory. When the processor obtains a new input image 440, the processor may compare the input image 440 with the first to third registered images 410 to 430 to determine whether to store the input image 440 as a registered image.

For convenience of description, in an example embodiment illustrated in FIG. 16, each of the first to third registered images 410 to 430 and the input image 440 corresponding to a region of a user fingerprint may be divided into eight unit regions. The processor may match the first to third registered images 410 to 430 to generate a first fingerprint image 450, and may match the input image 440 with the first fingerprint image 450 to generate a second fingerprint image 460.

A region of the second fingerprint image 460 in which two or more of the first to third registered images 410 to 430 and the input image 440 may overlap one another may be defined as a common region z. The processor may determine an individual region of each of the first to third registered images 410 to 430 and the input image 440, except for the common region z, and may determine an image that includes an individual region having the smallest area. In the example embodiment illustrated in FIG. 16, the individual region of the second registered image 420 may have the smallest area. Thus, the processor may replace the second registered image 420, stored in the memory, with the input image 440.

In another example embodiment, the processor may search for a registered image having the highest similarity to the input image 440 using the second fingerprint image 460. In the example embodiment illustrated in FIG. 16, the first registered image 410 may share three unit regions with the input image 440, the second registered image 420 may share four unit regions with the input image 440, and the third registered image 430 may share no unit region with the input image 440. When free storage space of the memory is insufficient (e.g., smaller than a threshold amount of space), the processor may delete the second registered image 420 having the highest similarity to the input image 440, and may store the input image 440 as a new registered image.

For example, in the example embodiment illustrated in FIG. 16, the processor may select, as a duplicate image, an image whose common region z has the greatest area, with reference to the second fingerprint image 460. In the example embodiment illustrated in FIG. 16, the second registered image 420 may be selected as the duplicate image. Thus, the processor may delete the second registered image 420 from the memory, and may store the input image 440 in the memory.

Figure 17:
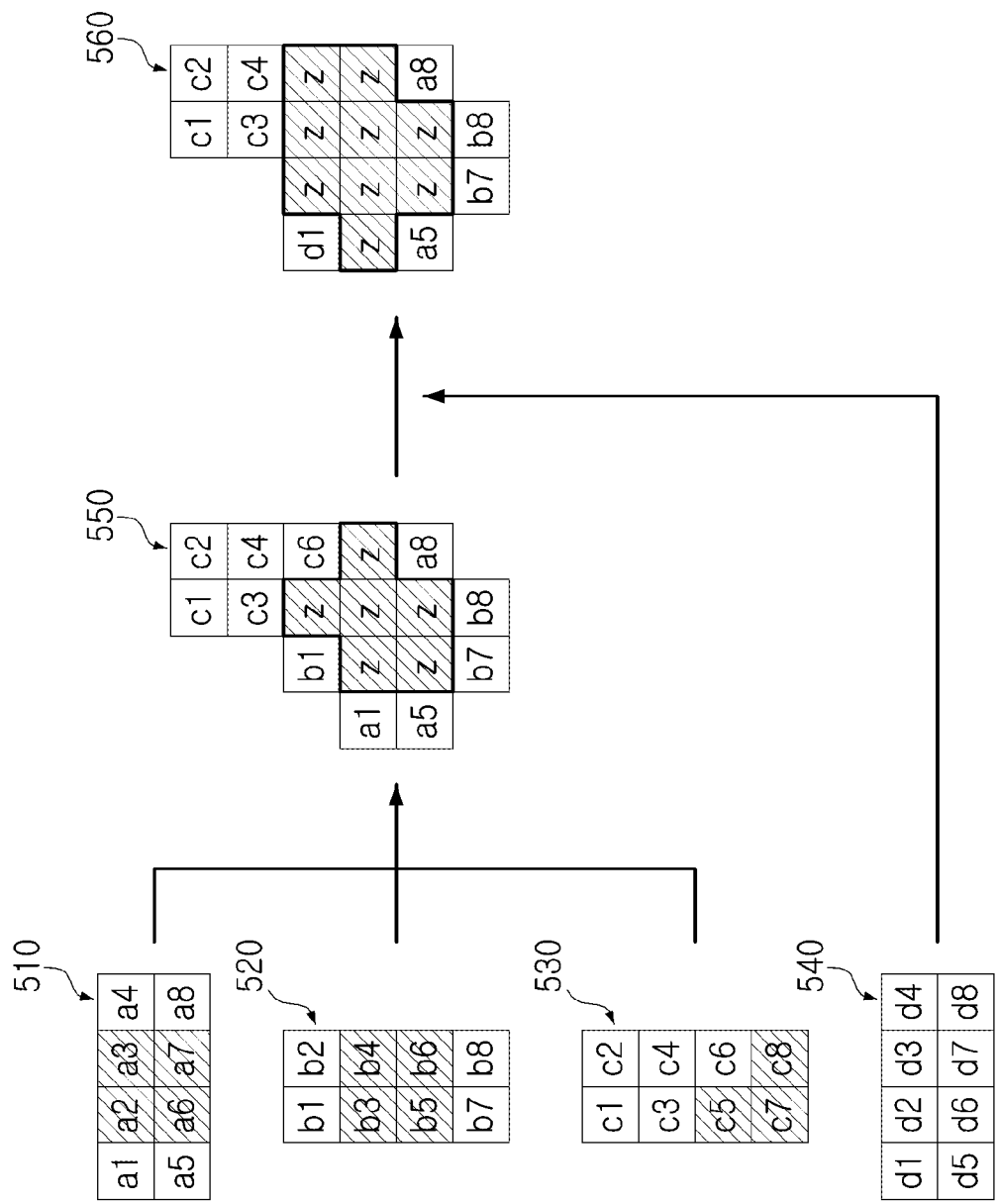

Referring to FIG. 17, first to third registered images 510 to 530 may be stored in the memory, and the processor may determine whether to store a newly obtained input image 540 as a registered image. For convenience of description, similar to the example embodiment illustrated in FIG. 16, each of the first to third registered images 510 to 530 and the input image 540 corresponding to a region of the user fingerprint may be divided into eight unit regions. The processor may match the first to third registered images 510 to 530 to generate a first fingerprint image 550, and may match the input image 540 with the first fingerprint image 550 to generate a second fingerprint image 560.

A region of the second fingerprint image 560 in which two or more of the first to third registered images 510 to 530 and the input image 540 may overlap with one another may be defined as a common region z. The processor may determine an individual region of each of the first to third registered images 510 to 530 and the input image 540, except for the common region z, and may determine an image that includes an individual region having the smallest area. In the example embodiment illustrated in FIG. 17, the individual region of the input image 540 may have the smallest area. Thus, the processor may retain the first to third registered images 510 to 530 that have been previously stored as is without storing the input image 540.

In the example embodiment illustrated in FIG. 17, the processor may select, as a duplicate image, an image whose common region z has the greatest area, with reference to the second fingerprint image 560. Thus, the processor may select the input image 540 as a duplicate image, and may retain the first to third registered images 510 to 530 that have been previously stored as is without storing the input image 540.

Figure 18:
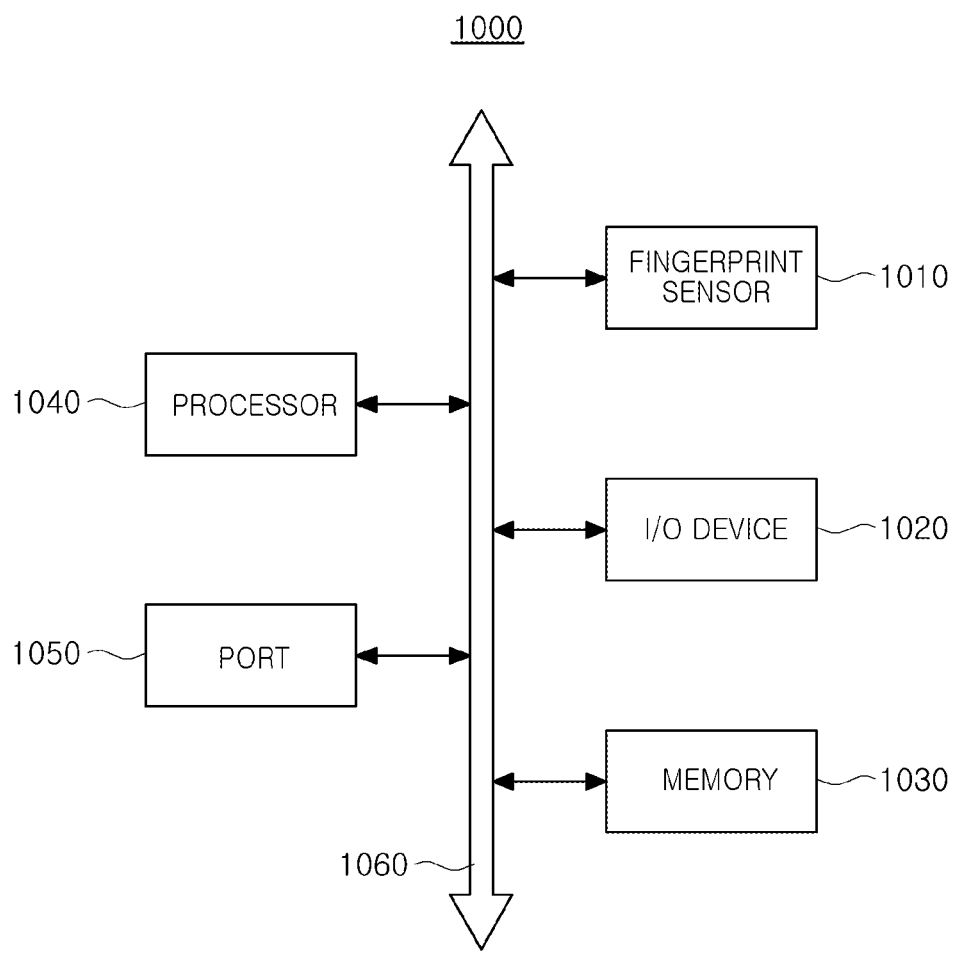
FIG. 18 is a block diagram illustrating an electronic device, according to an example embodiment.

FIG. 18 is a block diagram illustrating an electronic device, according to an example embodiment.

Referring to FIG. 18, a fingerprint sensor 1010, according to an example embodiment, may be applied to a computer device 1000. The computer device 1000, according to the example embodiment illustrated in FIG. 18, may include an input/output (I/O) device 1020, a memory 1030, a processor 1040, and a port 1050, in addition to the fingerprint sensor 1010. The computer device 1000 may further include a wired/wireless communications device, a power supply device, or the like. Among the components illustrated in FIG. 18, the port 1050 may be a device provided to allow the computer device 1000 to communicate with a video card, a sound card, a memory card, a universal serial bus (USB) device, or the like. The computer device 1000 may be a smartphone, a tablet personal computer (PC), a smart wearable device, or the like, as well as a desktop or laptop computer.

The processor 1040 may perform specific arithmetic operations, instructions, tasks, or the like. The processor 1040 may be a central processing unit (CPU) or a microprocessor unit (MCU), and may communicate with the memory 1030, the I/O device 1020, the fingerprint sensor 1010, and other devices connected to the port 1050, via a bus 1060.

The memory 1030 may be a storage medium that may store data required for operations of the computer device 1000, multimedia data, or the like. The memory 1030 may include a volatile memory, such as a random access memory (RAM), or a non-volatile memory, such as a flash memory or the like. Further, the memory 1030 may include at least one of a solid-state drive (SSD), a hard disk drive (HDD), and an optical disc drive (ODD), as a storage device. The memory 1030 may also store a registered image to be compared with an input image input through the fingerprint sensor 1010. The I/O device 1020 may include an input device for a user, such as a keyboard, a mouse, a touch-screen, or the like, and an output device, such as a display, an audio output unit, or the like.

The fingerprint sensor 1010 may be connected to the processor 1040 via the bus 1060 or by other communications units. The processor 1040 may compare the input image, received from the fingerprint sensor 1010, with the registered image stored in the memory 1030 to authenticate the user. The processor 1040 may compare, with a previously stored registered image, an input image that has passed through a user authentication procedure, or an input image obtained in a user registration procedure, and may store the input image in the memory 1030. A series of methods for storing an input image in the memory and managing a registered image stored in the memory by the processor 1040 may follow various example embodiments described above with reference to FIGS. 1 to 17.

As set forth above, according to example embodiments of the present disclosure, a method for processing fingerprint information may compare a newly obtained input image with a registered image to determine whether to store the input image as another registered image, based on the number of minutiae included in an individual region of the input image that may not overlap the registered image, the area of the individual region, or the like. Thus, the method may cover as many fingerprints as possible, and a wider possible range of fingerprint, using a small number of registered images, resulting in an increase in fingerprint recognition performance.

While example embodiments have been shown and described above, it will be apparent to those skilled in the art that modifications and variations could be made without departing from the scope of the present inventive concept, as defined by the appended claims.

What is claimed is:

1. A method for processing fingerprint information, comprising:
    obtaining an input image corresponding to at least a region of a user fingerprint;
    searching a memory storing at least one registered image for a reference registered image that matches the input image at least partially;
    determining a unique region of the input image in which the input image does not overlap with the reference registered image when the input image is aligned with the reference registered image; and
    in response to a score of the unique region of the input image being greater than or equal to a predetermined reference score, classifying the input image as belonging to a same group as the reference registered image and storing the input image in the memory, wherein the memory stores a plurality of registered images, and the plurality of registered images are classified into one or more groups, and wherein the memory further comprises:

matching the input image with candidate registered images among the plurality of registered images, wherein the candidate registered images are included in the same group as the reference registered image;

determining unique regions of the input image in which the candidate registered images do not overlap with the input image; and determining whether to store the input image in the memory based on an amount of free storage space of the memory and scores of the unique regions.

2. The method of claim 1, further comprising: calculating the score of the unique region based on at least one of a size of an area of the unique region and a number of minutiae present in the unique region.

3. The method of claim 2, wherein the score of the unique region is positively correlated with the size of the area of the unique region.

4. The method of claim 2, wherein the score of the unique region is positively correlated with the number of minutiae present in the unique region.

5. The method of claim 1, further comprising:

calculating a correction value required to align the reference registered image with the input image; and storing the correction value as image information associated with the input image.

6. The method of claim 5, wherein the correction value comprises at least one of a first correction value required to rotate the input image and a second correction value required to move the input image.

7. The method of claim 1, further comprising:

in response to the amount of the free storage space of the memory being below a threshold amount, searching for a first unique region, out of the unique regions, having a lowest score;

when the first unique region having the lowest score is included in the input image, not storing the input image; and when the first unique region having the lowest score is included in one of the candidate registered images, deleting the one of the candidate registered images including the first unique region having the lowest score and storing the input image in the memory.

8. The method of claim 7, wherein, when the one of the candidate registered images including the first unique region having the lowest score is obtained during a user registration procedure and the input image is obtained during a user authentication procedure, not deleting the one of the candidate registered images.

9. The method of claim 7, further comprising:

when a number of the candidate registered images is less than a predetermined threshold number, not deleting the one of the candidate registered images.

10. The method of claim 1, further comprising:

when the amount of the free storage space of the memory is greater than or equal to a threshold amount and the score of the unique region of the input image is greater than or equal to the predetermined reference score, classifying the input image as belonging to the same group as the candidate registered images and storing the input image in the memory.

11. An apparatus for processing fingerprint information, the apparatus comprising:

a memory configured to store at least one registered image;

a fingerprint sensor configured to obtain an input image through contact with a user fingerprint; and a processor configured to determine whether to store the input image in the memory by comparing the input image with the at least one registered image, wherein the processor is further configured to:

search the memory for a reference registered image that at least partially matches the input image, determine a unique region of the input image in which the input image does not overlap with the reference registered image by aligning the reference registered image with the input image, and, when a score of the unique region of the input image is greater than or equal to a predetermined reference score, classify the input image as belonging to a same group as the reference registered image and store the input image in the memory, wherein the memory is further configured to store a plurality of registered images, and wherein the processor is further configured to determine, as the reference registered image, a registered image having a highest similarity to the input image, among the plurality of registered images, and when an amount of free storage space of the memory is below a threshold amount, delete the reference registered image and store the input image.

12. The apparatus of claim 11, wherein the processor is further configured to calculate the score of the unique region based on at least one of a size of an area of the unique region and a number of minutiae present in the unique region.

13. The apparatus of claim 12, wherein the score of the unique region is positively correlated with the size of the area of the unique region.

14. The apparatus of claim 11, wherein the processor is further configured to:

compare the input image with the at least one registered image, and, when the input image passes a user authentication procedure, determine whether to store the input image in the memory.

* * * * *